United States Patent [19]
Rebers

[11] Patent Number: 5,842,891
[45] Date of Patent: Dec. 1, 1998

[54] EXTERNAL GROUND ISOLATION CONNECTOR FOR CABLE SPLICE CLOSURES

[75] Inventor: Kenneth D. Rebers, Austin, Tex.

[73] Assignee: Minnesota Mining and Manufacturing Company, St. Paul, Minn.

[21] Appl. No.: 821,974

[22] Filed: Mar. 18, 1997

[51] Int. Cl.⁶ .................................................. H01R 13/42
[52] U.S. Cl. ............................................................ 439/738
[58] Field of Search ................................ 174/78; 439/92, 439/521, 559, 737, 738, 801, 810–814, 908, 921

[56] References Cited

U.S. PATENT DOCUMENTS

| | | |
|---|---|---|
| 2,897,472 | 7/1959 | O'Brien . |
| 5,248,265 | 9/1993 | Goto et al. ................................ 439/559 |
| 5,318,459 | 6/1994 | Shields ................................. 439/559 X |
| 5,380,227 | 1/1995 | Taylor ................................. 439/801 X |
| 5,639,268 | 6/1997 | Julian et al. ......................... 439/801 X |

*Primary Examiner*—Khiem Nguyen
*Attorney, Agent, or Firm*—Gerald F. Chernivec

[57] ABSTRACT

An external ground isolation connector for use with a cable splice closure includes a housing having a keyed bore formed therein. A ground stud is keyed for extending through the bore in the housing so as to limit rotation of the stud within the housing. The ground stud has a first end for extending into an associated cable closure for connection to an internal ground wire, and a second end for extending externally of the cable closure for connection to an external ground wire. A port is formed in the housing for receiving the external ground wire. The first end of the ground stud is provided to be sealed with the housing and the closure and the second end of the ground stud is provided to be sealed with the housing.

20 Claims, 5 Drawing Sheets

5,842,891

EXTERNAL GROUND ISOLATION CONNECTOR FOR CABLE SPLICE CLOSURES

BACKGROUND OF THE INVENTION

The present invention relates generally to sealed cable splice closures and more particularly to an external ground isolation connector used with such closures.

There are various methods for joining or splicing communication cable ends together. Such cables are typically constructed of a conductor bundle, surrounded by a metal strength and interference sheathing and an outer protective coating. The cable bundles must be grounded which requires a connection to the ground shield of the bundle within the closure and an external ground connection.

This requires the internal and external ground wires to pass through the closure via a sealed, i.e. air and water tight, connection so as to avoid environmental contamination. In order to accomplish this, various apparatus for providing a sealed ground wire connection for the closure have been used. One such device is a ground lug which extends through the wall of the closure. The internal ground wires are connected to a portion of the lug within the closure and the external ground wires are connected to a portion of the lug on the outside of the closure. Various sealants, compounds, heat shrink layers etc. are then applied to the outer portion of the ground lug to seal the connection to the lug and to the outer surface of the closure. These cold seals, however, are often unreliable especially if external forces are applied which may move the lug or external ground wires sufficiently to break the seal.

Unfortunately, a suitable solution to the problems associated with sealing the ground connections to the cable splice closure so as to maintain seal integrity, has not been satisfactorily addressed by the prior art. Therefore, what is needed is an apparatus and method for sealing ground wire connections to cable closure housings. It is also highly desirable to provide a re-entry and quick re-seal of such ground connections which can be easily disconnected and re-connected while maintaining seal integrity.

SUMMARY OF THE INVENTION

The present invention accordingly, provides an apparatus and method for providing a sealed ground connection for cable splice closures which can be disconnected and re-connected and maintain seal integrity. To this end, an external ground isolation connector includes a housing and a ground stud extending through the housing. The ground stud has a first end for extending into an associated cable closure, and a second end for extending externally of the cable closure. Means are provided for connecting ground wires to the first and second ends of the ground stud and means are also provided for sealing the ground stud within the housing.

A principal advantage of the present invention is that the external ground isolation connector permits a sealed connection of the internal and external ground wires through the wall of a cable closure and allows for disconnection and re-connection of the external ground wire in a manner which allows for quick re-entry and closure to maintain seal integrity. This is in contrast to prior art devices which require destruction of external ground wire sealed connections.

DESCRIPTION OF THE PREFERRED EMBODIMENT

Figure 1:
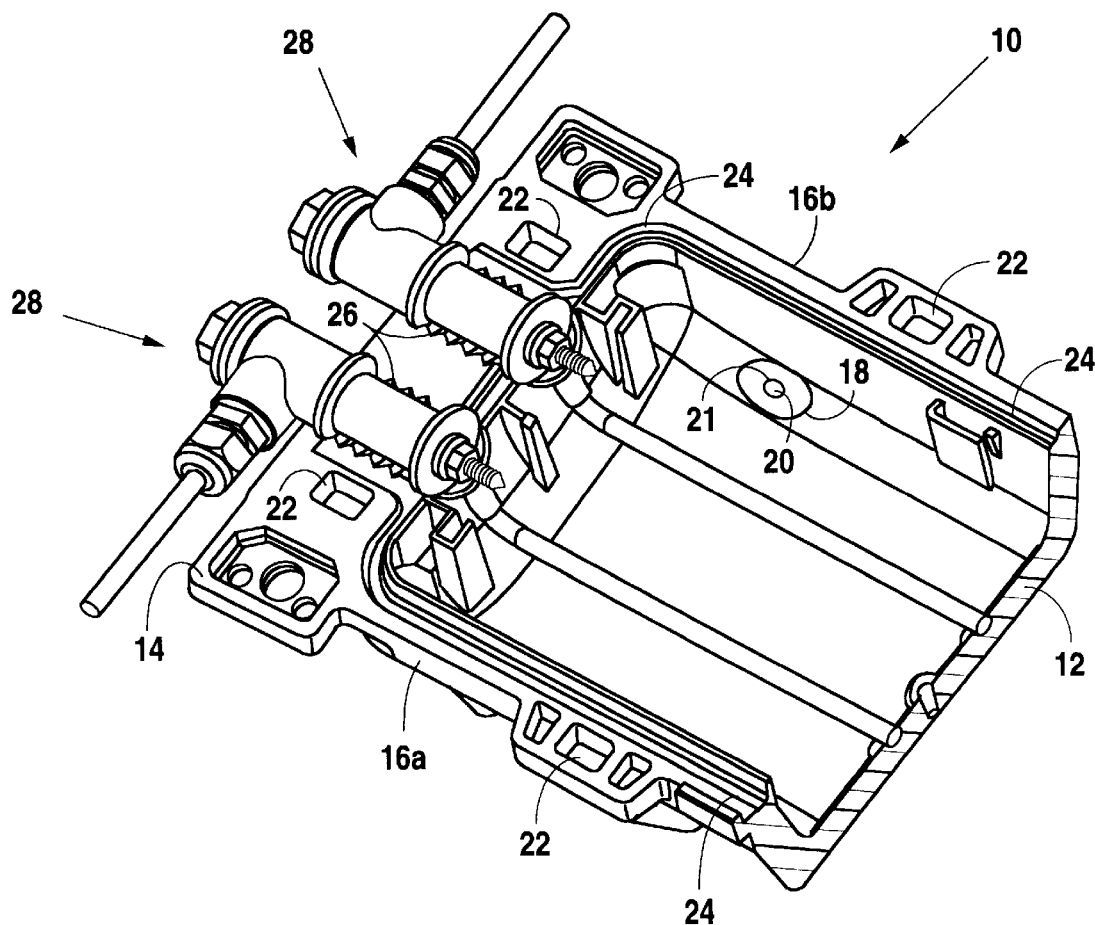
FIG. 1 is an isometric view illustrating an embodiment of a portion of a cable closure including a pair of ground isolation connectors mounted in cable ports.

Referring to FIG. 1, one end of a pair of identical halves of a cable splice closure is illustrated and generally designated 10. Closure 10 includes a wall 12 which is integrally formed with end flanges 14, only one of which is shown, and a portion of a pair of spaced apart side flanges 16a, 16b. Wall 12, viewed from the inside of closure 10, includes a plugged mounting surface 18 for receiving a ground stud. Mounting surface 18 is also formed on the outside of wall 12. Removal of a plug 20 forms an opening 21 for receiving the ground stud.

Bolt holes 22 are formed in end flange 14 and side flanges 16a, 16b for receiving bolts for holding mating halves of closure 10 together. Also, a continuous peripheral groove 24 is provided along end flange 14 and side flanges 16a, 16b for receiving a suitable mastic or gasket material for providing a re-entry type of closure. A pair of cable ports 26 are also included in end flange 14 to provide a cable ingress and egress path with the closure 10. The ports 26 are typically also sealed with the abovementioned mastic or gasket material to provide suitable end seals around the cables in the ports 26. The ports 26 are also typically provided with plugs in place (not shown) which may be removed as required to accommodate cables.

A ground isolation connector 28, FIGS. 1–4, is provided for use with closure 10. In one embodiment, connector 28 can be mounted in one of the preformed cable ports 26, if available, or on an external surface of wall 12. Connector 28 includes a main housing 30, FIG. 2, having a first portion 32 and a second portion 34. First portion 32 includes a spool shaped outer surface 32a which is provided to nest into cable port 26. Second portion 34 includes an external ground wire port 34a formed therewith. Main housing 30 also includes a keyed bore 36 formed therethrough, FIG. 4a. Bore 36 is keyed with a hexagonal, cross-sectional shape, however, other cross-sectional shapes may be used. A threaded bore 38, FIG. 3, formed in port 34a extends to form an intersection with hex-shaped bore 36. An "O" ring groove 40 is provided in a flange 42 of second portion 34 adjacent ground wire port 34a for receiving a sealing "O" ring 41.

Figure 2:
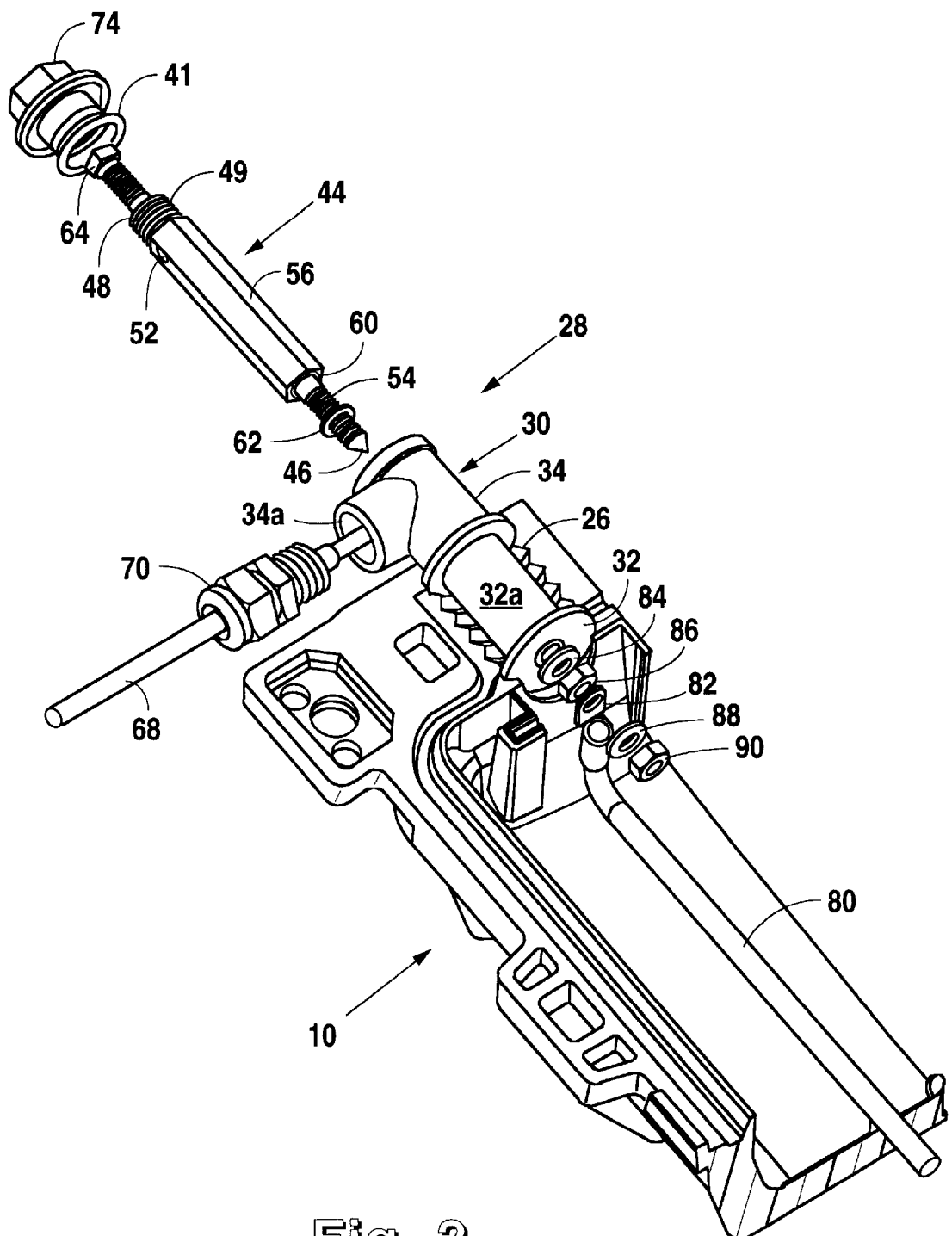
FIG. 2 is an isometric view illustrating an embodiment of a portion of a cable closure including a ground isolation connector in exploded view, mounted in a cable port.
Figure 3:
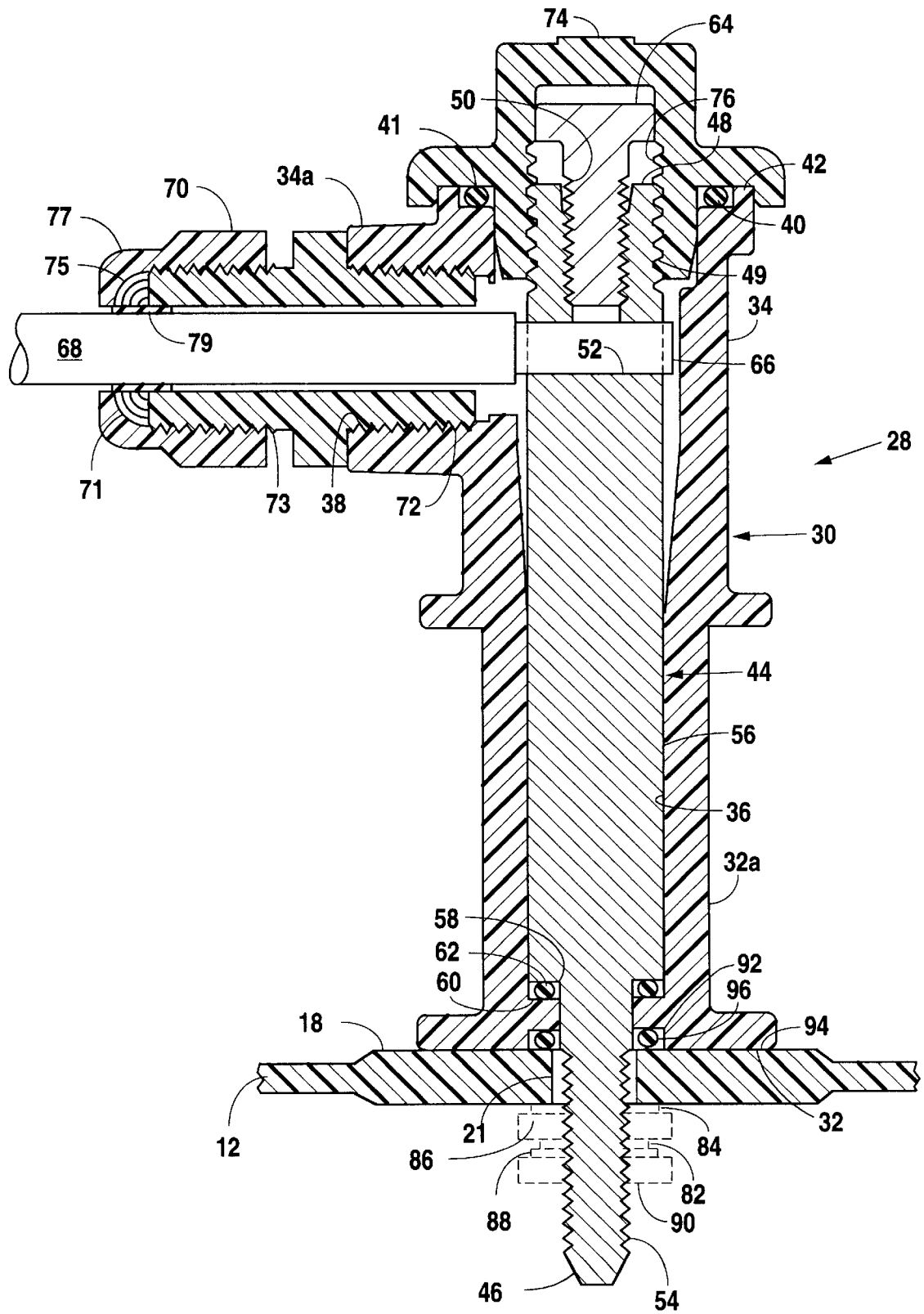
FIG. 3 is a cross-sectional view in side elevation, illustrating an embodiment of a ground isolation connector externally mounted on a wall of a cable closure.
Figure 4:
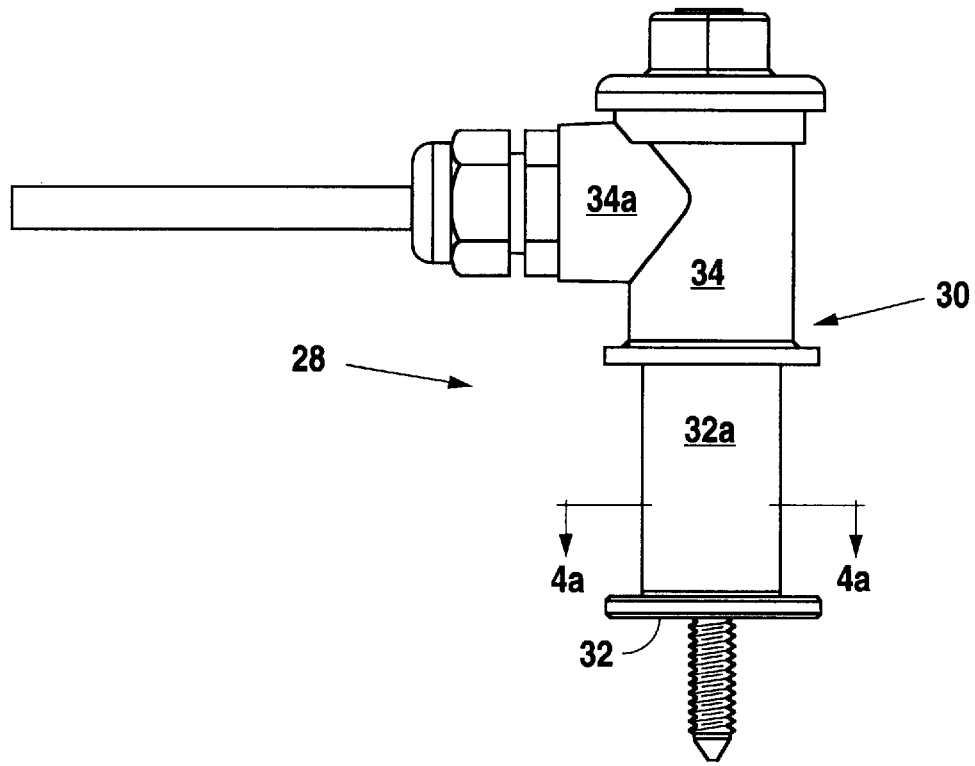
FIG. 4 is a side elevation view illustrating an embodiment of a ground isolation connector.
Figure 4A:
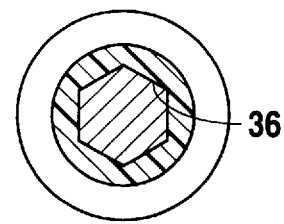
FIG. 4a is a cross-sectional view taken along the line 4a—4a of FIG. 3.

A ground stud 44, FIGS. 2 and 3, includes a first end 46 and a second end 48. Second end 48, FIG. 3, includes an external threaded portion 49 and an internal threaded bore 50 which extends to intersect with an external ground wire cross-bore 52. First end 46 includes a threaded extension 54 which extends from a central shaft portion 56 having a hexagonally shaped cross-section, FIG. 2, for mating engagement within hex bore 36. In this manner, ground stud 44 is in anti-rotational engagement with hex bore 36. An "O" ring groove 58 is provided adjacent a land 60 between central shaft 56 and threaded extension 54 for receiving a sealing "O" ring 62.

A cap screw 64, FIG. 3, is threadably received in threaded bore 50 and seats to securely engage a stripped end 66 of an external ground wire 68. The ground wire 68 is retained in a commercially available liquid tight fitting 70 which has a threaded end 72 received into threaded bore 38 in port 34a. Fitting 70 includes a flexible sealing end 71 which grips ground wire 68. An end 77 is rotatable relative to end 71 on threaded shaft 73. The relative rotation urges a plurality of flexible fingers 75 and resilient sleeve 79 into sealing contact with wire 68. A housing cap 74 includes an internal threaded blind bore 76 which threadably engages threaded portion 49 of ground stud 44 and urges sealing "O" ring 41 into sealing engagement with groove 40.

An internal ground wire 80, FIG. 2, is attachable to threaded extension 54 by means of a connector 82 which receives extension 54. A washer 84 and a nut 86 engage extension 54 and draw "O" ring 62, FIG. 3, into sealing engagement between first portion 32 of housing 30 and groove 58 of ground stud 44. Another washer 88 and another nut 90, FIGS. 2 and 3, engage extension 54 and secure connector 82 onto extension 54.

When cable ports 26 are occupied with cables, connector 28, FIG. 3, can be mounted on an external surface of wall 12 at mounting surface 18 with plug 20 removed to provide opening 21. Another "O" ring groove 92 is provided in a flange 94 of first portion 32. Groove 92 retains an "O" ring 96 for sealingly seating first portion 32 of housing 30 against mounting surface 18 of wall 12.

Figure 5:
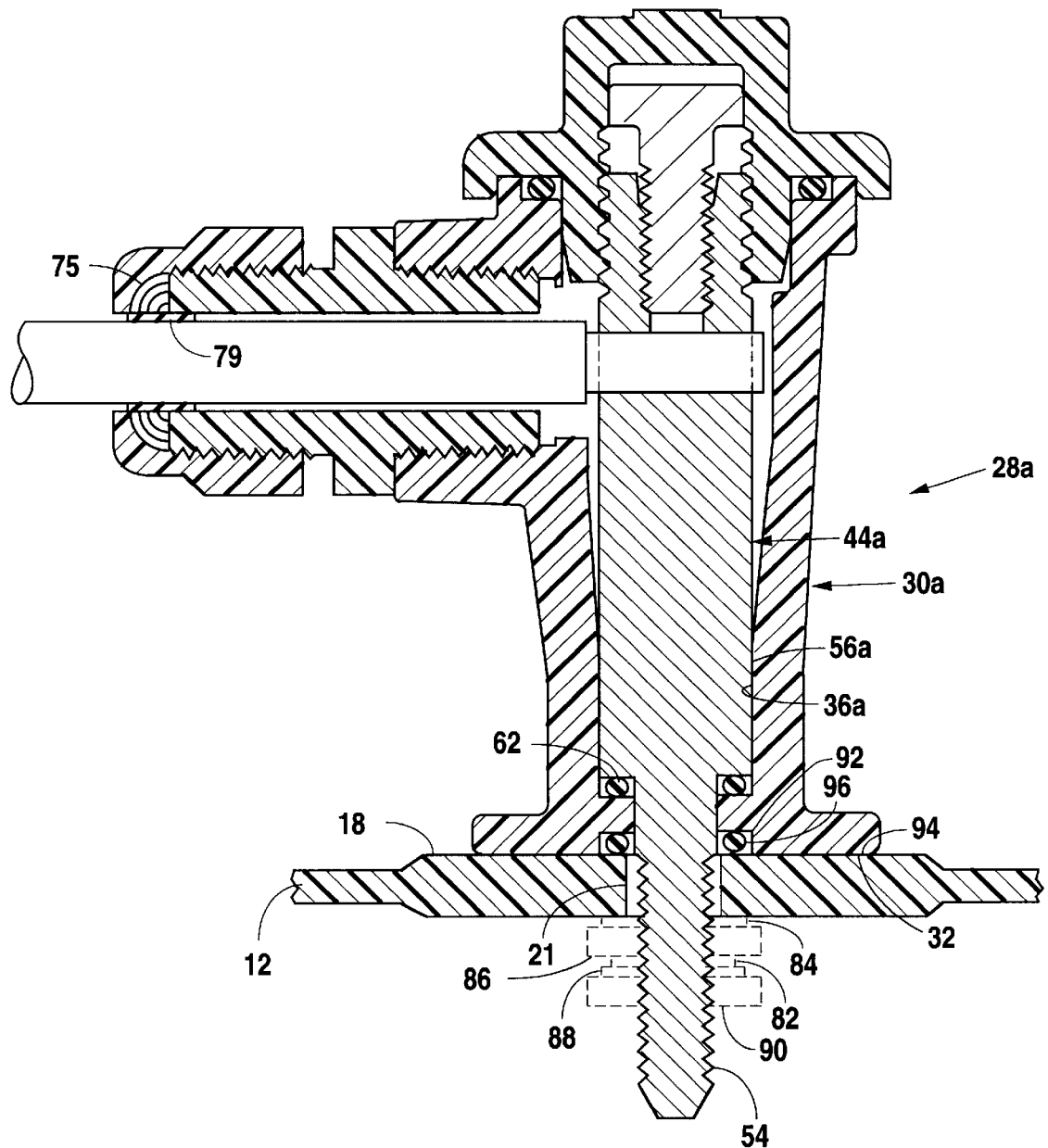
FIG. 5 is a cross-sectional view in side elevation, illustrating an alternative embodiment of a ground isolation connector externally mounted on a wall of a cable closure.

In a further embodiment, FIG. 5, a modified connector 28a has a reduced length housing 30a by disposing of the spool portion 32a, discussed above and illustrated in FIGS. 2 and 3. Connector 28a also includes a reduced length ground stud 44a having a hex shaped portion 56a mated with a hex bore 36a. All other attributes of the connector and ground stud remain as described above. The purpose of the reduced length connector 28a is for applications where a reduced length connector is preferred for external connection directly to wall 12 only, whereas connector 28, illustrated in FIGS. 1–4, can be either inserted into cable port 26, FIGS. 1 and 2, or externally attached directly to wall 12, FIG. 3.

In operation, stud 44 is inserted into connector 28. First end 46 extends from housing 30. Fitting 70 is threaded into port 34a. External ground wire 68 is inserted through fitting 70 and cross-bore 52. Fitting 70 is tightened to form a seal with wire 68. Cap screw 64 is adjusted to engage and maintain wire end 60 in bore 52. Housing cap 74 is sealingly threaded onto housing 30. Spool portion 32a is inserted into cable port 26 and sealed therein. Nut 86 is adjusted to seal stud 44 to housing 30. Internal ground wire 80 is attached to extension 54 and secured thereto by nut 90.

Alternatively, instead of mounting connector 28 in cable port 26, "O" ring 96 is inserted in groove 92 and flange 94 is seated on mounting surface 18 externally of wall 12. Nut 86 is adjusted to compress "O" rings 96 and 62 and seal stud 44 and housing 30 to mounting surface 18 of wall 12. Internal ground wire 80 is attached to extension 54 and secured thereto by nut 90.

As a further alternative, reduced length connector 28a is used with stud 44a. The "O" ring 96 is inserted in groove 92 and flange 94 is seated on mounting surface 18 of wall 12. Nut 86 is adjusted to compress "O" rings 96 and 62 and seal stud 44a and housing 30a to mounting surface 18 externally of wall 12. Internal ground wire 80 is attached to extension 54 and secured thereto by nut 90.

As it can be seen, the principal advantage of these embodiments is that the external ground isolation connector permits a sealed connection of the internal and external ground wires through the wall of a cable closure, or through a cable port of a cable closure, and allows for disconnection and reconnection of the wires in a manner which maintains seal integrity.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An external ground isolation connector comprising:
   a housing;
   a ground stud extending through the housing, the ground stud having a first end for extending into an associated cable closure, and a second end for extending externally of the cable closure;
   means for connecting ground wires to the first and second ends of the ground stud including a ground wire receiving bore formed in the ground stud and a cap screw for extending into the wire receiving bore for engaging and retaining a ground wire therein; and
   means for sealing the ground stud within the housing.

2. The connector as defined in claim 1 further comprising means for limiting rotation of the ground stud within the housing.

3. The connector as defined in claim 1 further comprising a first portion of the housing having a spool shaped outer surface and a second portion of the housing having a ground wire port formed therewith.

4. The connector as defined in claim 1 wherein the housing has a keyed bore formed therethrough and the ground stud has an outer surface keyed for mating engagement with the keyed bore.

5. The connector as defined in claim 1 wherein the means for sealing includes seals adjacent first and second ends of the housing, respectively.

6. The connector as defined in claim 1 further comprising a cap for threaded engagement with the ground stud and sealing engagement with the housing.

7. The connector as defined in claim 1 wherein the first end of the ground stud includes a portion which sealingly engages the housing.

8. An external ground isolation connector comprising:
   a housing including a keyed bore formed therethrough;
   a ground stud keyed for extending through the bore in the housing so as to limit rotation of the stud within the housing, the ground stud having a first end for extending into an associated cable closure, and a second end for extending externally of the cable closure;
   the housing including a port formed therein for receiving an external ground wire therein;
   a ground wire receiving bore formed in the ground stud adjacent the second end thereof and a cap screw for extending into the wire receiving bore for engaging and retaining the external ground wire therein;
   means for connecting an internal ground wire to the first end of the ground stud;
   means for sealing the housing with the cable closure; and
   means for sealing the ground stud within the housing.

9. The connector as defined in claim 8 further comprising a first portion of the housing having a spool shaped outer surface.

10. The connector as defined in claim 8 wherein the means for sealing the housing with the associated cable closure includes a spool shaped outer housing surface for mating engagement with a cable port formed in the associated closure.

11. The connector as defined in claim 10 wherein the means for sealing the ground stud within the housing includes seals adjacent opposite ends of the housing.

12. The connector as defined in claim 8 further comprising a cap for threaded engagement with the ground stud and sealing engagement with the housing.

13. The connector as defined in claim 8 wherein the first end of the ground stud includes a portion which sealingly engages the housing.

14. The connector as defined in claim 8 further comprising a cap for sealing engagement with the housing, means for retaining the external ground wire in engagement with the second end of the ground stud and means for retaining the internal ground wire connected to the first end of the ground stud.

15. The connector as defined in claim 8 wherein the port is provided to receive a sealing ground wire fitting.

16. An external ground isolation connector for use with a cable splice closure comprising:

a cable splice closure including a wall defining an internal chamber and an external surface;

a connector housing mounted on the closure;

a ground stud extending through the housing, the ground stud having a first end terminating in the internal chamber and a second end terminating within the connector housing;

means for connecting an internal ground wire to the first end of the ground stud;

a ground wire receiving bore formed in the ground stud for connecting an external ground wire adjacent the second end of the ground stud and a cap screw for extending into the wire receiving bore for engaging and retaining the external ground wire therein;

first means for sealingly attaching the connector housing to the closure; and second means for sealing the ground stud within the connector housing.

17. The connector as defined in claim 16 further comprising a first portion of the housing having a spool shaped outer surface.

18. The connector as defined in claim 16 wherein the housing has a keyed bore formed therethrough and the ground stud has an outer surface keyed for mating engagement with the keyed bore.

19. The connector as defined in claim 16 wherein the first means for sealingly attaching the housing to the closure includes a spool shaped outer surface of the housing for mating engagement with a cable port formed in the closure.

20. The connector as defined in claim 19 wherein the housing includes a cap and the second means for sealing the ground stud in the housing includes a first seal between the stud and the housing and a second seal between the housing and the cap.

* * * * *